United States Patent
Wagner (10) Patent No.: US 6,478,316 B1
(45) Date of Patent: Nov. 12, 2002

(54) ROLLER ARRANGEMENT FOR WHEELED LUGGAGE

(75) Inventor: Thomas Wagner, Iffeldorf (DE)

(73) Assignee: Thomas Wagner GmbH, Penzberg (DE)

( * ) Notice: Subject to any disclaimer, the term of this patent is extended or adjusted under 35 U.S.C. 154(b) by 0 days.

(21) Appl. No.: 09/825,556

(22) Filed: Apr. 3, 2001

Related U.S. Application Data (63) Continuation of application No. PCT/EP99/06134, filed on Aug. 21, 1999.

(30) Foreign Application Priority Data

Oct. 1, 1998 (DE) .......................................... 198 45 236

(51) Int. Cl.⁷ .................................................. B62B 1/00
(52) U.S. Cl. .......................................... 280/37; 190/18
(58) Field of Search ........................ 280/37, 38, 47.22, 280/47.26; 190/18 A; 16/35 D, 44

(56) References Cited

U.S. PATENT DOCUMENTS

| 4,335,896 A | * | 6/1982 | Koffler et al. | ........... 280/47.17 |
| 4,485,521 A | * | 12/1984 | Welsch et al. | ................. 16/44 |
| 4,524,482 A | | 6/1985 | Mueller | |
| 4,649,595 A | * | 3/1987 | Shane | ..................... 18/18 CG |
| 4,854,602 A | * | 8/1989 | Takeuchi | ................. 280/79.11 |
| 5,103,530 A | * | 4/1992 | Andrisin, III et al. | .......... 16/20 |
| 5,390,393 A | * | 2/1995 | Reppert et al. | ................. 16/21 |
| 5,394,589 A | * | 3/1995 | Braeger et al. | ................. 16/44 |
| 5,758,752 A | * | 6/1998 | King et al. | ............... 190/18 A |
| 5,921,635 A | * | 7/1999 | Deliman et al. | ............ 301/111 |
| 6,212,733 B1 | * | 4/2001 | Yeh | ............................ 16/35 R |

FOREIGN PATENT DOCUMENTS

| EP | 0064269 | * 11/1982 | ........... B60B/33/04 |
| GB | 641 316 | 4/1948 | |
| GB | 860 352 | 2/1961 | |
| GB | 861 382 | 2/1961 | |
| GB | 2 304 095 | 3/1997 | |

* cited by examiner

*Primary Examiner*—Brian L. Johnson
*Assistant Examiner*—Paul Royal, Jr.
(74) *Attorney, Agent, or Firm*—Katten Muchin Zavis Rosenman (57) ABSTRACT

A roller arrangement for rollers on which luggage containers such as suitcases, trolleys and the like can be moved comprises several rollers supported in a corner area of the lower edge of a container in a roller housing which reinforces the corner. A rocker which can be displaced is arranged in the roller housing. At least one roller is arranged at a distance from the bearing of said rocker. The rocker is additionally, completely or partially cushioned by one or several elastomer pads.

13 Claims, 6 Drawing Sheets

ROLLER ARRANGEMENT FOR WHEELED LUGGAGE

This application is a continuation of PCT/EP99/06134 Ser. No. 08/21/1999.

BACKGROUND OF THE INVENTION

Field of the Invention

The present invention relates to a luggage container having wheels with shock absorbers.

Such a roller arrangement, as described in British Patent publication 2,304,095 or in U.S. Pat. No. 4,524,482, is particularly common in hard-shell suitcases, but also increasingly in hand luggage such as conventional trolleys. Such roller arrangements have for this purpose reinforced rounded corners in which rollers are mounted having running surfaces extending over the corresponding roller housing in the corner area, in such a way that in each case contact with the ground is maintained when such luggage is switched in the position for pulling.

According to one roller arrangement, which is described in British Patent GB860352A, a roller is mounted by a pivoting lever or arm which is supported against an elastomer pad inside a roller housing or well.

The known roller arrangements have the disadvantage that shocks caused by the irregularities of the ground are transmitted to the luggage containers without sufficient absorption, since the surface of the roller generally is provided by a wheel ring made of a relatively hard elastomer. In the case of heavy luggage containers, there is after a short time of use the danger that the ring be destroyed which generates high repair costs, particularly since the simple replacement of the roller by the user is not possible most of the time.

SUMMARY OF THE INVENTION

It is an object of the present invention to provide a roller arrangement which not only has a lifetime which is longer than the known roller arrangements, but also which improves the rolling comfort or smoothness of the ride as the luggage container is in motion.

According to the invention, there is provided a luggage container having a roller arrangement for rolling movement of luggage containers such as suitcases trolleys, and the like, wherein one or more rollers are each rotatably mounted in a corner area of the lower bottom edge of a container in a roller housing which reinforces the corner, wherein in the roller housing a pivot arm is pivotally mounted to which at least one said roller is mounted at a distance from a bearing of said roller, movement of said pivot arm being cushioned, in both pivot directions, by one or more elastomeric pads.

In this respect, it is particularly important to stress that the roller in each housing is not mounted directly but rather by a pivoting member whose movements are damped by one or more elastomeric pads or specific elastomeric absorbers. For this purpose, there is provided, in an appropriate order between the pivoting members and the roller housing, such elastomeric pads or elastomeric absorbers as damping elements. It is particularly advantageous that damping elements are provided both above and below the pivoting member with respect to the pulling position of the luggage. This way, vertical shocks are efficiently absorbed, particularly for the vertical component of the shock absorption.

Due to the shock absorption of the pivoting member, a desirable decrease in the noise is obtained, i.e. in particular the shocks caused by cracks or seams in the floor or pavement are absorbed.

According to the invention, elastomer pads or absorbers having different softness or flexibility can be chosen as necessary; e.g. it is also possible that the absorber which is placed rearwardly above, on which essentially the total weight of the luggage rests, be relatively soft, while the lower absorbers provided on the front side of the pivoting member, be relatively stiff to limit the amplitude of the swing.

BRIEF DESCRIPTION OF THE DRAWINGS

The invention will be better understood by way of the following detailed description of preferred embodiments of the invention with reference to the appended drawings, in which.

DETAILED DESCRIPTION OF THE PREFERRED EMBODIMENTS

Figure 1:
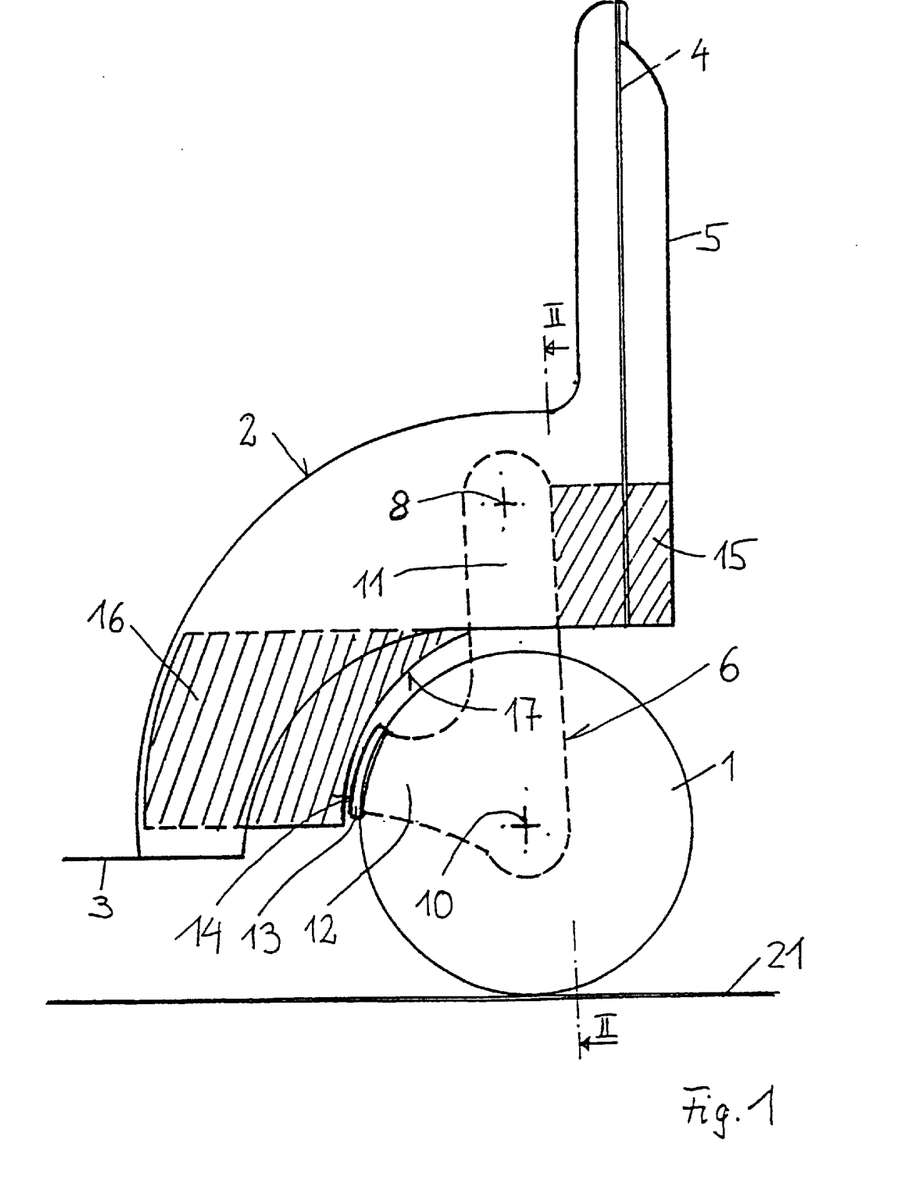
FIG. 1 shows a roller arrangement with only one roller.
Figure 2:
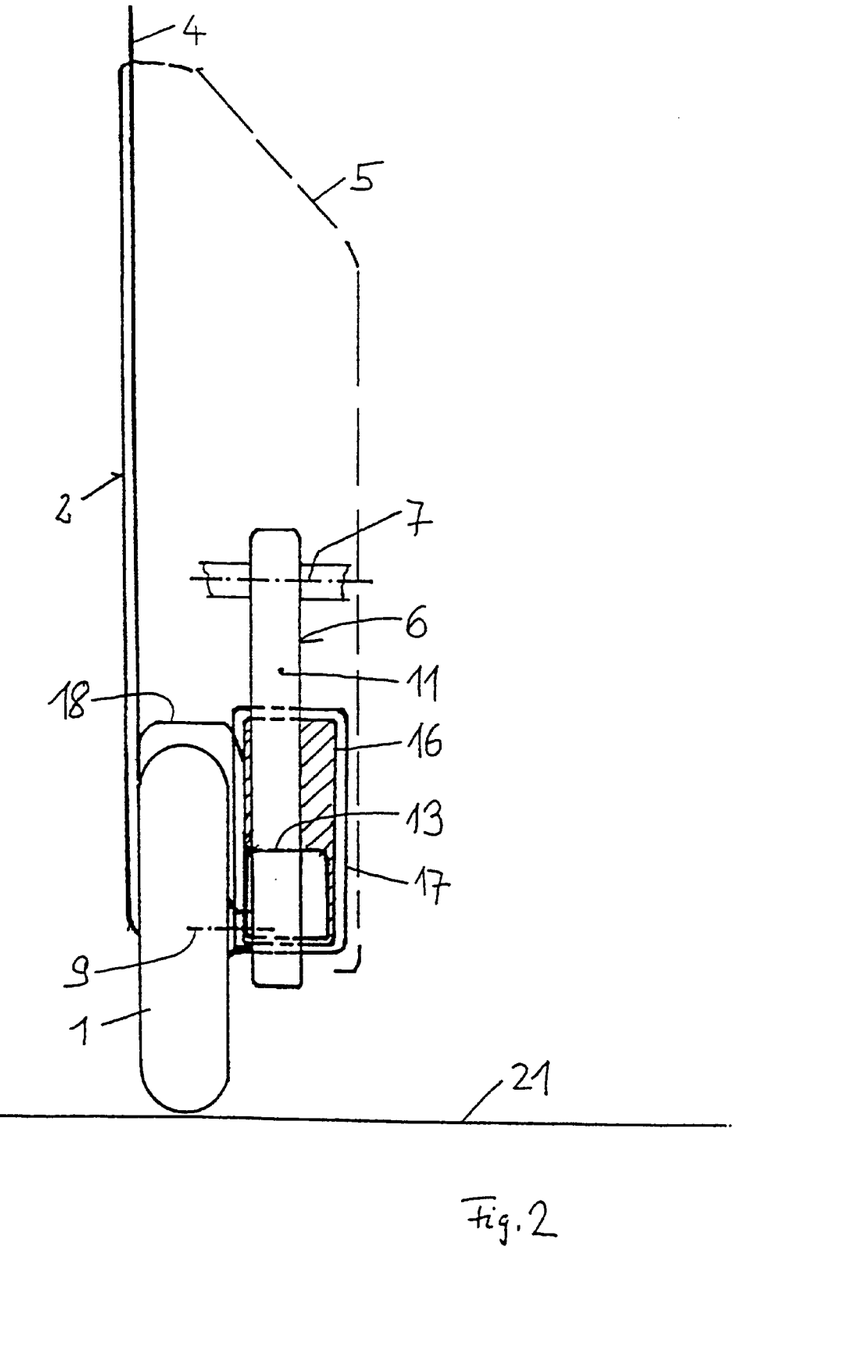
FIG. 2 shows a side view of a roller arrangement according to FIG. 1.

A roller arrangement with only one roller is shown in FIGS. 1 and 2. The roller 1 is mounted inside the roller housing 2, which is made, for example, of metal or hard plastic, and built in to the corners of the luggage. The outline of the luggage is shown simply by broken lines 3 for the bottom parallel and 4 for the vertical outline. A front side cover part 5 of the roller housing 2 makes mounting easier and ensures shock protection.

Inside the roller housing 2, there is a pivoting member 6 in the area of the upper end which is mounted about the axle shaft 7 which is shown in FIG. 1 as axle 8. The roller 1 again is mounted in the area of the lower end of the pivoting member 6 about axis 9, shown in FIG. 1 as axis 10.

The pivoting member 6 is essentially swing arm 11 with the two axes 8, 10 as well as a support 12 provided at its free end and extends from the arm towards the inner part of the roller housing 2. The support 12 supports at its free ends outside of the circumference of roller 1 a support plate 13, at which end an abutment surface is present. The roller 1 again in the area of lower end of the pivoting member 6 is rotatively connected about the axle 9, shown in FIG. 1 as axis 10.

The pivoting member 6 comprises essentially a swinging arm 11 having two axes 8, 10 and a support 12 provided at the free end of the swinging arm 11, which support branches from the arm 11 toward the inside of the roller housing 2. The support 12 has a support plate 13 at its free end outside the circumference of the roller 1. An abutment surface 14 is formed on the support plate.

In order to restrict movement and support the swing movement of the pivoting member 6 and at the same time the roller 1, two elastomeric absorbers are attached to the inside of the roller housing. A front or upper elastomeric pad 15 is placed adjacent to the axis 8 between the arm 11 of the pivoting member and the cover of the housing 5. This elastomer pad 15, which is preferably made of relatively hard elastomeric material, limits the rotational movement of the pivoting member in counterclockwise direction. The dampening properties of the upper elastomeric absorber 15 is basically responsible for the quiet running of the luggage container.

With respect to the swinging arm 11, a further elastomeric absorber 16 is positioned rearwardly, such that the elastomeric absorber 16 essentially supports the weight of the luggage container when in the forward leaning pull position. Since the lower elastomeric absorber having an inner surface 17 facing the roller 1 contacts the abutment surface 14 of the support 12, an elastomer material is selected with the purpose that it has a somewhat softer change of load compared with the upper elastomeric absorber, such that the shocks generated by the irregularities of the ground during pulling along and transmitted to the luggage container are relatively reduced in the upward direction.

The elastomeric absorbers are illustrated in the drawings as hatched simply to improve clarity and this should be in no case interpreted as a cross-sectional illustration.

In FIG. 2 the upper elastomer absorber 15 has been omitted for clarity. However, a housing cavity 17 is illustrated, in which the lower elastomer absorber 16 is received, as well as a housing cavity for the roller 1. In this respect, FIG. 2 corresponds somewhat to sectional view about line II—II of FIG. 1.

Figure 3:
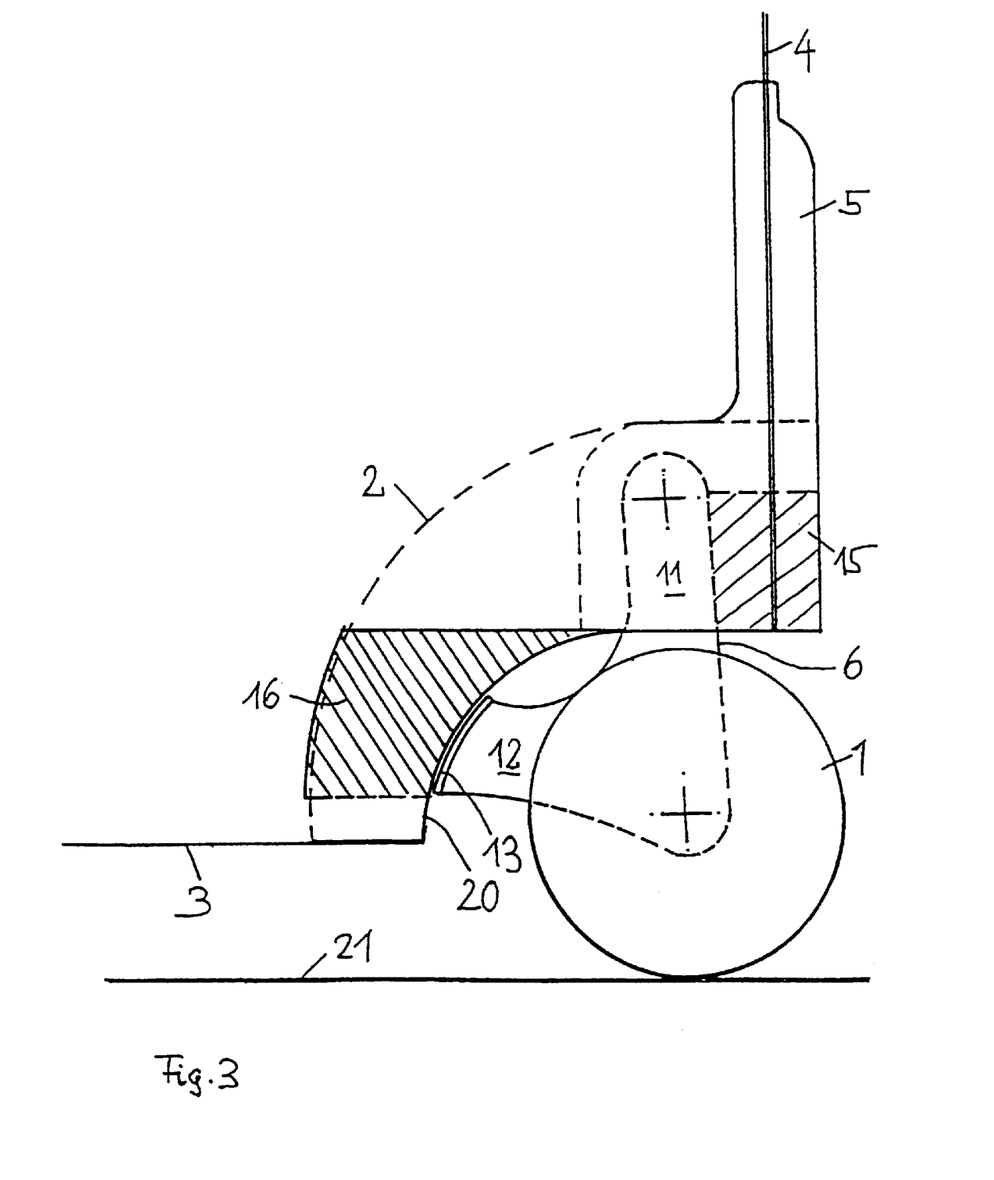
FIG. 3 shows a roller arrangement with double roller.
Figure 4:
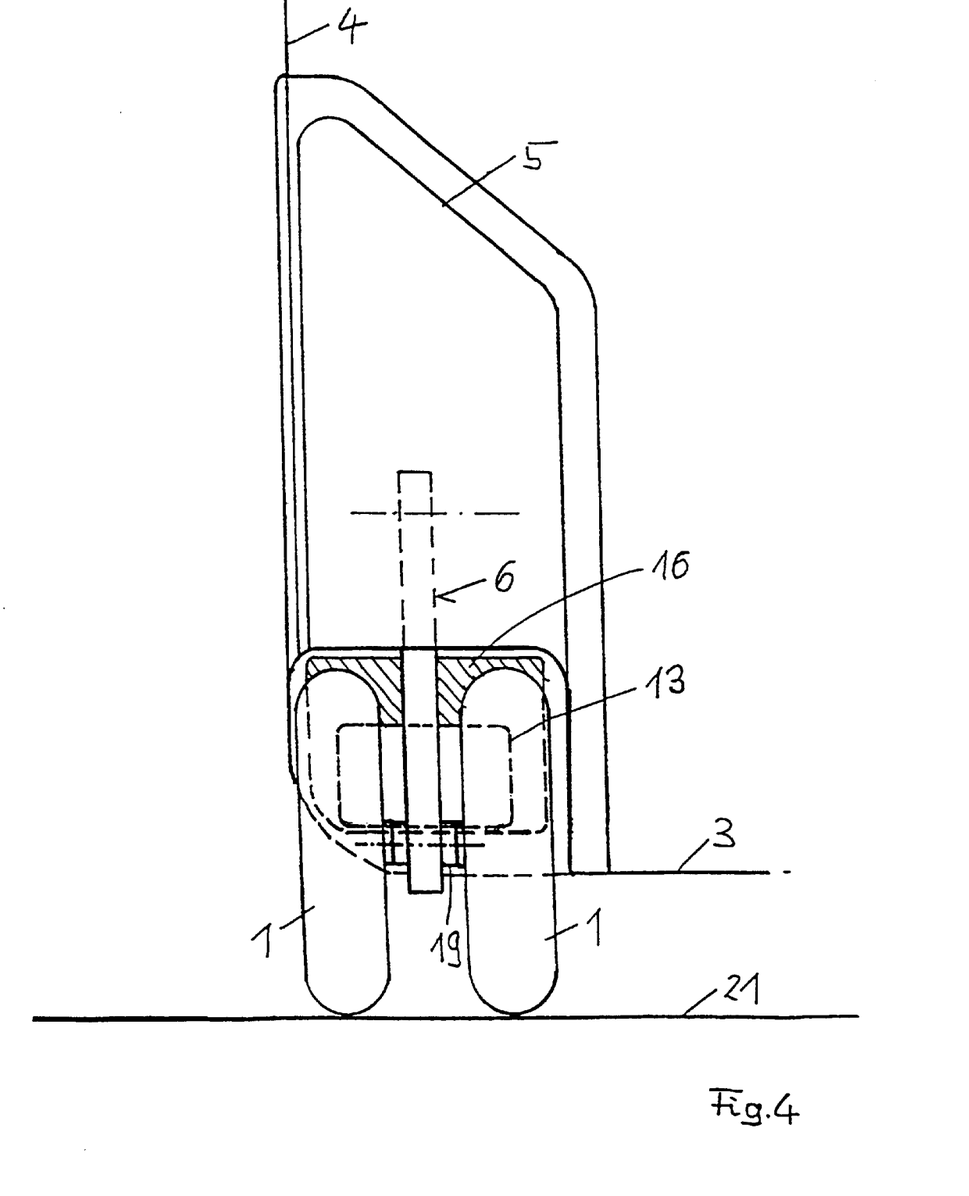
FIG. 4 shows a side view of a roller arrangement according to FIG. 3.

The embodiment of FIGS. 3 and 4 is different from the above described embodiment basically due to the positioning of the two rollers 1 which are rotatably mounted about axle 19 on the pivoting member 6. Moreover, the lower elastomer absorber 16 is made smaller in comparison with the embodiment according to FIGS. 1 and 2, so that the absorber 16 is located inside contour 20 facing the roller housing 2. Accordingly, the support 12 extends rearwardly.

As shown in FIG. 4, it will be seen that pivoting member 6 is placed in the middle between the two rollers 1 and that the support plate 13 is secured symmetrically to the support 12.

Figure 5:
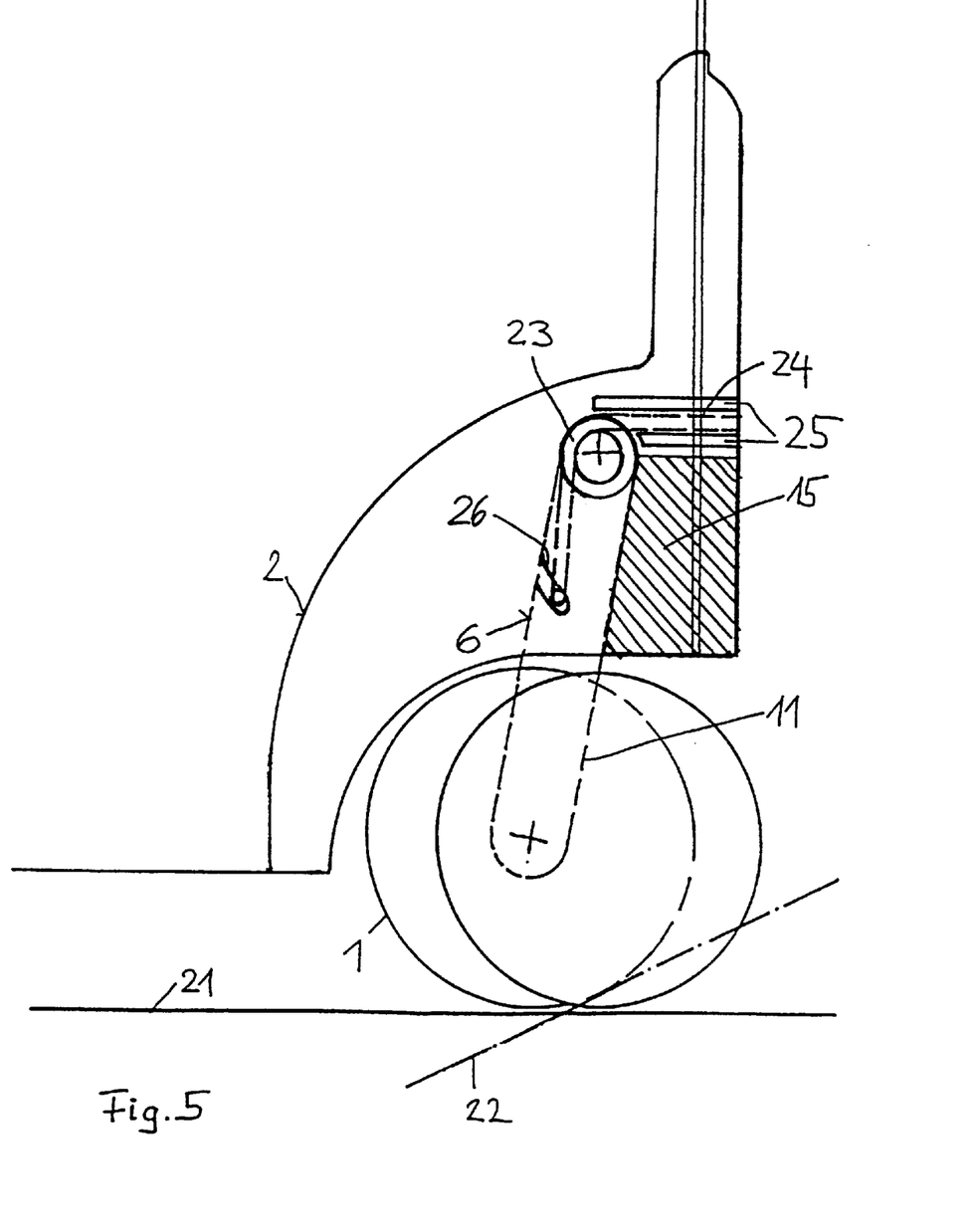
FIG. 5 shows a side view of a roller arrangement, wherein a coil spring is placed between the luggage container and the roller.

In the embodiments of FIGS. 1 to 4, the luggage container is always shown at rest in the vertical position with respect to the ground surface 21. In the moving position, however, the luggage container is shown tilted forwardly about the rollers in the clockwise direction. This is shown in FIG. 5 where the roller 1 is in the forward rest position and in the rearwardly shifted moving position. For the rearward moving position, the change in the angle of surface of the ground is shown by dashed line 22. This moving position corresponds to the swivel position of pivoting member 6 on which the roller 1 corresponding to the moving position of the luggage container is shown.

In the embodiment of FIG. 5, which shows a pivoting member 6 in form of the simple swing arm 11, the above elastomer absorbers are not shown. Instead, a coil spring 23 is provided which is mounted about the upper bearing axle of the arm 11 and is supported with one end 24 between ribs 25 of the roller housing and with another end in a slot 26 of the arm 11, such that the arm 11 is biased counterclockwise by the spring 23.

Figure 6:
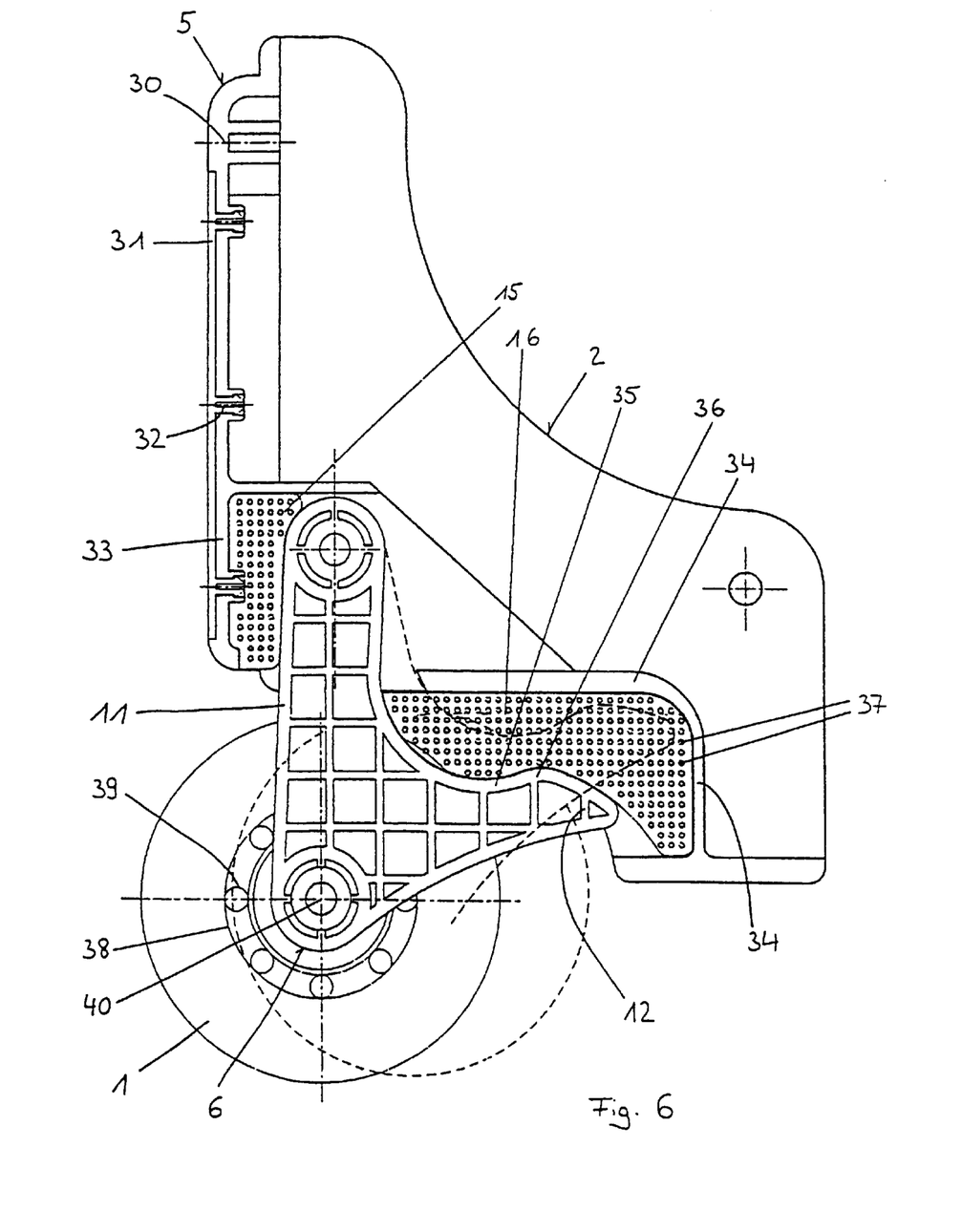
FIG. 6 shows a side view of a further roller arrangement.

FIG. 6 shows a roller arrangement in a preferred embodiment suitable for mass production. The roller housing 2 comprises a front side cover member 5 secured using a screw connection at 30. A lengthwise vertically extending housing aperture in the cover member 5 is covered by a cover plate 31 secured to the cover member 5 by means of sideways biased anchoring members 32. The cover plate 31 provides particularly a support for a logo or each trademark under which the finished piece of luggage will be sold.

On the lower side of the roller housing 2, a first elastomeric absorber 15 is provided which is adjacent the upper end of the arm 11 of the pivoting member 6 and is supported by the front plate 33 of the cover member 5. A second elastomeric absorber 16 is positioned above the support 12 of the pivoting member 6 and fills also a cavity above the support 12. The absorber 16 is formed between the cavity and a lower angularly extending housing wall 34 of the roller housing 2. The second elastomeric absorber 16 has a somewhat S-shaped contour corresponding to the extent of the upper side 35 of the support 12, the contour being basically horizontally tilted.

In FIG. 6, the counterclockwise tilted position of the pivoting member 6 is shown in dashed lines, which position is assumed when the piece of luggage is pulled by the user. The bulge 36 resulting from the S-shape on the upper side 35 of the support 12 has the advantageous effect of reducing relative movement between the support 12 and the elastomeric absorber 16, i.e. the pad 16 is practically only subjected to compression. In this way, the pads, 15 and 16 are porous blocks of elastomers and their molding under compression is made easier, thus prolonging at the same time their service life. Both pads 15, 16 have, as shown in the drawing, numerous parallel through-holes 37, which are transverse to the load direction and are open from the side.

The hub 28 of the roller 1 is shown without any complementary cover. The holes 39 are for inserting mounting bolts of a corresponding hub cover. The roller 1 comprises preferably two roller bodies that are rotatably mounted tightly against one another about the axle 40, thus achieving greater load capacity.

Embodiments of the invention in which an exclusive property or privilege is claimed are defined as follows:

What is claimed is:

1. A roller arrangement for rolling movement of luggage containers, suitcases and trolleys, the container having a lower bottom edge with laterally spaced corner areas, said arrangement comprising:

one or more rollers, each rotatably mounted in a corner area of the lower bottom edge of the container in a roller housing which reinforces the corner;

a pivoting member pivotally-mounted to an axle located in the roller housing, the pivoting member being pivotal about an axis in a first pivoting direction inward towards the roller housing and a second pivoting direction away from the roller housing and opposite the first direction;

at least one elastomeric pad within the roller housing;

wherein at least one roller is mounted to the pivoting member at a location spaced from the pivoting member's axle, and further wherein the at least one roller rotates around an axis parallel to the pivot axis of the pivoting member's axle, and further wherein the pivoting member surface engages the at least one elastomeric pad during pivotal movement in the first or second pivoting direction.

2. A luggage container according to claim 1, wherein the pivoting member is essentially embedded in an elastomeric pad.

3. A luggage container according to claim 2, wherein only a free end of the pivoting member is being opposite to its axle essentially embedded in an elastomeric pad.

4. A luggage container according to claim 1, wherein the pivoting member is supported, at one or more positions, opposite the roller housing, by one or more of said elastomeric pads.

5. A luggage container according to claim 1, wherein the pivoting member has a swinging arm with an upper end mounted in the roller housing, and that at a free end of the swinging arm, a support is provided, a free end of the support abutting against one of said elastomeric pads.

6. A luggage container according to claim 5, wherein the free end of the support ends with an abutment surface outside a circumference of the roller, which abutment surface is directed against to the surface of the elastomer pad.

7. A luggage container according to claim 6, wherein said abutment surface points, in an initial position of said pivoting member, against a direction of travel of said container.

8. A luggage container according to claim 7, wherein said abutment surface has an upwardly curved slanted section having a curvature in a direction of a pivot axis of the swinging arm.

9. A luggage container according to claim 1, wherein said pivoting member is supported by two elastomer pads, a first one of said pads being positioned close to a bearing of said pivoting member, between said pivoting member and a part of said housing provided forwards with respect to a direction of travel of said container, a second one of said pads being close to a free end of the pivoting member and positioned in a part of said housing provided opposite to said direction of travel.

10. A luggage container according to claim 1, wherein said pivot arm is supported by two elastomer pads, a first one of said pads being positioned close to a bearing of said pivot arm, between said pivot arm and a part of said housing provided forwards with respect to a direction of travel of said container, a second one of said pads being close to a free end of the pivot arm and positioned in a part of said housing provided opposite to said direction of travel.

11. A luggage container according to claim 10, wherein said first pad is placed between said swing arm and a front of said roller housing, and said second elastomer pad is placed between said support and a rear of said roller housing.

12. A luggage container according to claim 10, wherein said second elastomer pad essentially absorbs vertical shocks resulting from travel of said luggage container when tilted for travel, while said first pad dampens movement of said pivot arm with respect to said roller housing.

13. A luggage container according to claim 10, wherein said at least one pads are made of blocks of synthetic rubber comprising numerous parallel holes extending transversely with respect to a loading direction of said one or more pads.

* * * * *

UNITED STATES PATENT AND TRADEMARK OFFICE
CERTIFICATE OF CORRECTION

PATENT NO.     : 6,478,316 B1                                                Page 1 of 1
DATED          : November 12, 2002
INVENTOR(S)    : Thomas Wagner et al.

It is certified that error appears in the above-identified patent and that said Letters Patent is hereby corrected as shown below:

<u>Title page,</u>
Item [22], please correct the Filing Date to read -- April 2, 2001 --.

Signed and Sealed this

Twenty-fifth Day of February, 2003

JAMES E. ROGAN
*Director of the United States Patent and Trademark Office*